United States Patent [19]

Strossman et al.

[11] Patent Number: 5,521,710
[45] Date of Patent: May 28, 1996

[54] METHOD OF APPLYING ELECTRONICALLY STORED LABELS FROM A SOURCE JOB TO A DESTINATION JOB IN A PRINTING SYSTEM

[75] Inventors: James C. Strossman, Rose; Linda D. King; Hollise G. Mitter-Brown, both of Rochester; Michael W. Barrett, Fairport, all of N.Y.

[73] Assignee: Xerox Corporation, Stamford, Conn.

[21] Appl. No.: 226,739

[22] Filed: Apr. 12, 1994

[51] Int. Cl.$^6$ ............................... H04N 1/21; H04N 1/40
[52] U.S. Cl. ................ 358/296; 358/298; 358/455; 358/456; 358/465; 358/466
[58] Field of Search ................ 358/296, 298, 358/455, 456, 465, 466; 355/202

[56] References Cited

U.S. PATENT DOCUMENTS

| | | | |
|---|---|---|---|
| 4,085,445 | 4/1978 | Blevins et al. | 364/960.2 |
| 4,306,803 | 12/1981 | Donohue et al. | 355/204 |
| 4,494,862 | 1/1985 | Tanaka | 355/202 |
| 4,542,378 | 9/1985 | Suganuma et al. | 358/450 |
| 4,674,040 | 6/1987 | Barker et al. | 395/600 |
| 4,920,337 | 4/1990 | Kuo | 395/146 |
| 4,992,827 | 2/1991 | Kobayashi et al. | 358/296 |
| 5,016,048 | 5/1991 | Watanabe | 355/202 |
| 5,091,746 | 2/1992 | Watanabe | 358/296 |

FOREIGN PATENT DOCUMENTS

| | | |
|---|---|---|
| 374892A2 | 6/1990 | European Pat. Off. . |
| 490471A2 | 6/1992 | European Pat. Off. . |

OTHER PUBLICATIONS

Karen L. Acerson, Word Perfect—The Complete Reference, 1988, pp. 245–248.

*Primary Examiner*—Benjamin R. Fuller
*Assistant Examiner*—Raquel Yvette Gordon
*Attorney, Agent, or Firm*—Gary B. Cohen

[57] ABSTRACT

There is provided a method of labeling a job in a printing system. The method includes the steps of storing, in memory, a list of electronic labels and displaying, on a display screen, both the list of electronic labels and a print outline with a selected identifiable area. The selected identifiable area is positionable on the print outline for representing a relative size, location and orientation of an area on a print upon which a selected one of the electronic labels is to be printed, and the displaying step includes applying a grid to the list so that a series of cells is superposed relative to the the electronic labels. In operation, a first location at which a copy of the selected electronic label is to be printed on a selected one of a plurality of prints is indicated and a plurality of prints, with the selected electronic label printed on the selected print at the first location, is produced when all of the selected electronic label is disposed in a selected one of the series of cells.

11 Claims, 18 Drawing Sheets

FIG. 16

METHOD OF APPLYING ELECTRONICALLY STORED LABELS FROM A SOURCE JOB TO A DESTINATION JOB IN A PRINTING SYSTEM

The present disclosure is related, in subject matter, to now allowed copending U.S. Continuation-in-Part patent application Ser. No. 08/226,166 entitled "A Method of Applying Electronically Stored Labels to a Print Job", filed Apr. 12, 1994, to Rourke et al., and U.S. Pat. No. 5,309,558 to Rourke et al. The pertinent portions of each of these applications are incorporated herein.

The present invention relates generally to a technique for producing a print job with a printing system, and, more particularly, to a method for printing a label, from an electronic list of labels, at a designated location, on a selected print resulting from the printing of the print job.

Electronic printing systems employ image signals or pixels as the image source when producing prints. In using printing systems of this type, a very desirable option would be the ability to automatically add information, i.e., addresses or labels, to the prints or print sets as they are produced. This would save the cost, time, and bother of subsequently addressing or labeling the prints later as, for example, by pasting address labels on the prints, handwriting the addresses, etc. To gain maximum use of an option of this type, referred to as set addressing herein, the user must have the ability to pick and choose the addresses that are to be used. This requires editing capability that will allow the user to temporarily remove some addresses from his/her address list in accordance with the demands of a particular job. Further, the user needs the ability to re-shuffle the order and position of the addresses or labels in the address or label list, to add addresses and/or labels from other lists, to change the size of the addresses/labels and the position of the addresses/labels on the prints, etc. And, there also should be provided a way in which the user can easily create new electronic address/label lists to add to the operator's address/label library for future jobs.

In the prior art, U.S. Pat. Nos. 4,521,096 to Suganuma et al. and 4,322,157 to Miura et al. disclose apparatus for combining information from different forms to generate documents with composite images based on data from several image memory sources. U.S. Pat. No. 4,639,791 to Masaki discloses an image overlay apparatus with electronic image storage in which a combined image is created by overlaying images from two different sources. And U.S. Pat. No. 4,124,286 to Barasch discloses a system for printing a composite image wherein a first image is formed on a photoconductive media and then transferred to a second photoconductive media where a second image is formed overlay the first image.

The following is a list of references, which were deemed by the U.S. Patent and Trademark Office as relating the set labeling, were cited during the U.S. prosecution of now allowed U.S. patent application Ser. No. 07/628,130:

U.S. Pat. No. 4,306,803

Patentees: Donohue et al.

Issued: Dec. 22, 1981

U.S. Pat. No. 4,494,862

Patentee: Tanaka

Issued: Jan. 22, 1985

U.S. Pat. No. 4,674,040

Patentees: Barker et al.

Issued: Jun. 16, 1987

U.S. Pat. No. 4,920,337

Patentee: Kuo

Issued: Apr. 24, 1990

U.S. Pat. No. 4,992,827

Patentees: Kobayashi et al.

Issued: Feb. 12, 1991

U.S. Pat. No. 5,016,048

Patentee: Watanabe

Issued: May 14, 1991

U.S. Pat. No. 5,091,746

Patentee: Watanabe

Issued: Feb. 25, 1992

Acerson, K. L.

"WordPerfect®: The Complete Reference

McGraw-Hill

Published: 1988 pp. 245–48

The following is a list of references cited during the European prosecution of now allowed U.S. Patent Application Ser. No. 07/628,130:

U.S. Pat. No. 4,085,445

Patentees: Blevins et al.

Issued: Apr. 18, 1978

U.S. Pat. No. 4,542,378

Patentees: Suganuma et al.

Issued: Sep. 17, 1985

European Patent Application No.: 89123569.9

Publication No.: 0 374 892 A2

Date of Publication: Jun. 27, 1990

U.S. patent application Ser. No. 07/628,130 was published as the following European patent application:

European Patent Application No.: 91308840.7

Publication No.: 0 490 471 A2

Date of Publication: Jun. 17, 1992

Now allowed U.S. patent application Ser. No. 07/628,130 discloses the following regarding a source of addresses for use in labeling the print job:

Another source of addresses is a prepared address sheet containing mailing labels/addresses. An example of this is a '33 -up' mailer sheet. The system can be programmed to crop a specific address location or by step and repeat, scan in each address individually and place the address in a stored sequential list. The above can be done in a single scan or in multiple scans.

While this passage suggests that the capability of the source list can be expanded by use of a list, structured in the form of a matrix, it does not contemplate the full range of features that can be obtained through the employment of such list type. It would be desirable to provide a set labeling approach which optimizes the use of the source list.

In accordance with the present invention there is provided a method of labeling a job in a printing system. The method includes the steps of: storing, in memory, a list of electronic labels; displaying, on a display screen, the list of electronic labels and a print outline with a selected identifiable area, the selected identifiable area being positionable on the print outline for representing a relative size, location and orientation of an area on a print upon which a selected one of the electronic labels is to be printed, said displaying step including applying a grid to the list so that a series of cells is superposed relative to the the electronic labels; indicating, with the print outline, a first location at which a copy of the selected electronic label is to be printed on a selected one of a plurality of prints; and printing the plurality of prints, when all of the selected electronic label is disposed in a selected one of the series of cells, so that the copy of the selected electronic label is printed on the selected print at the first location.

These and other aspects of the invention will become apparent from the following description, the description being used to illustrate a preferred embodiment of the invention when read in conjunction with the accompanying drawings.

Figure 1:
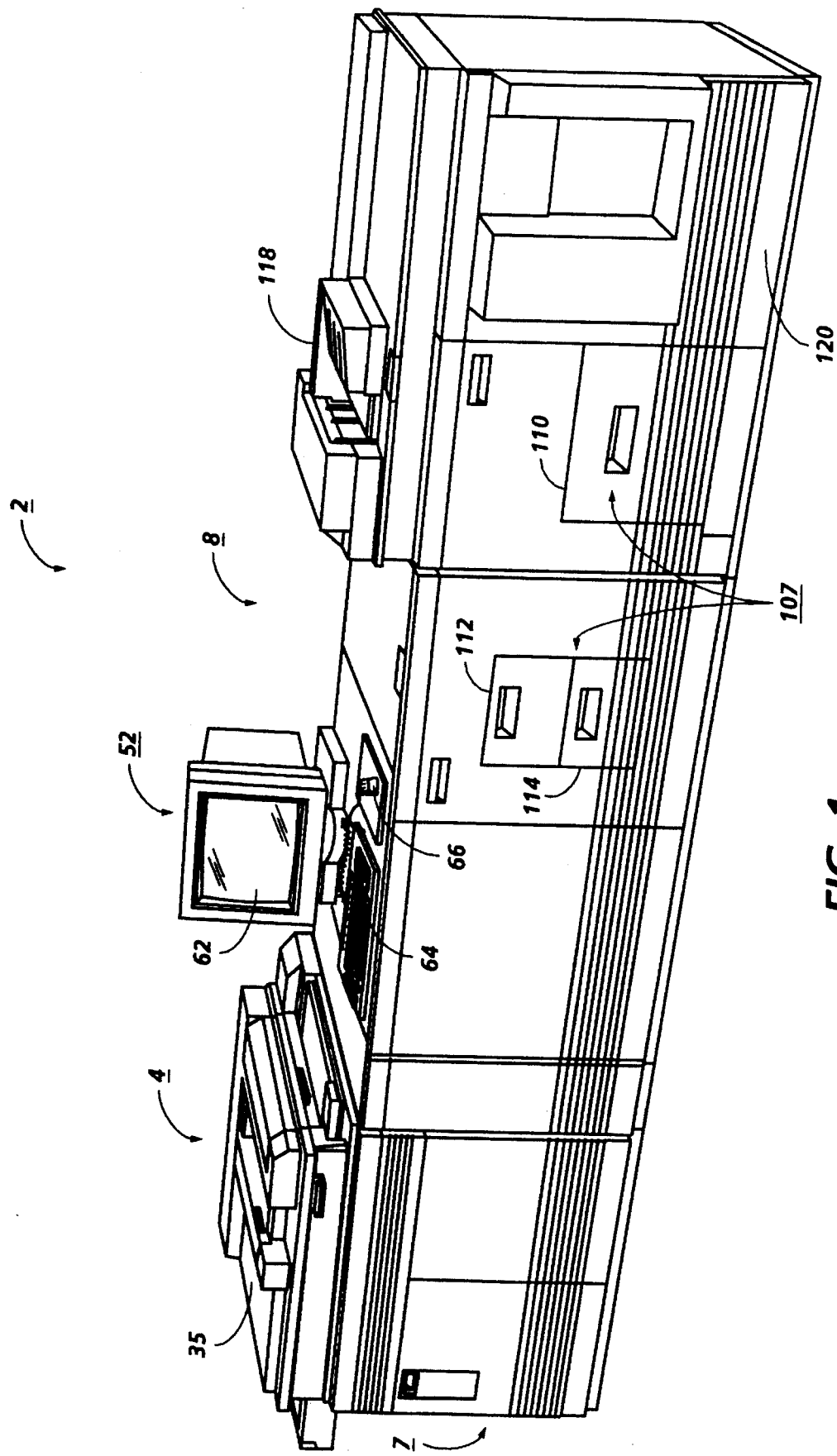
FIG. 1 is a perspective view depicting an electronic printing system incorporating the set addressing process of the present invention.
Figure 3:
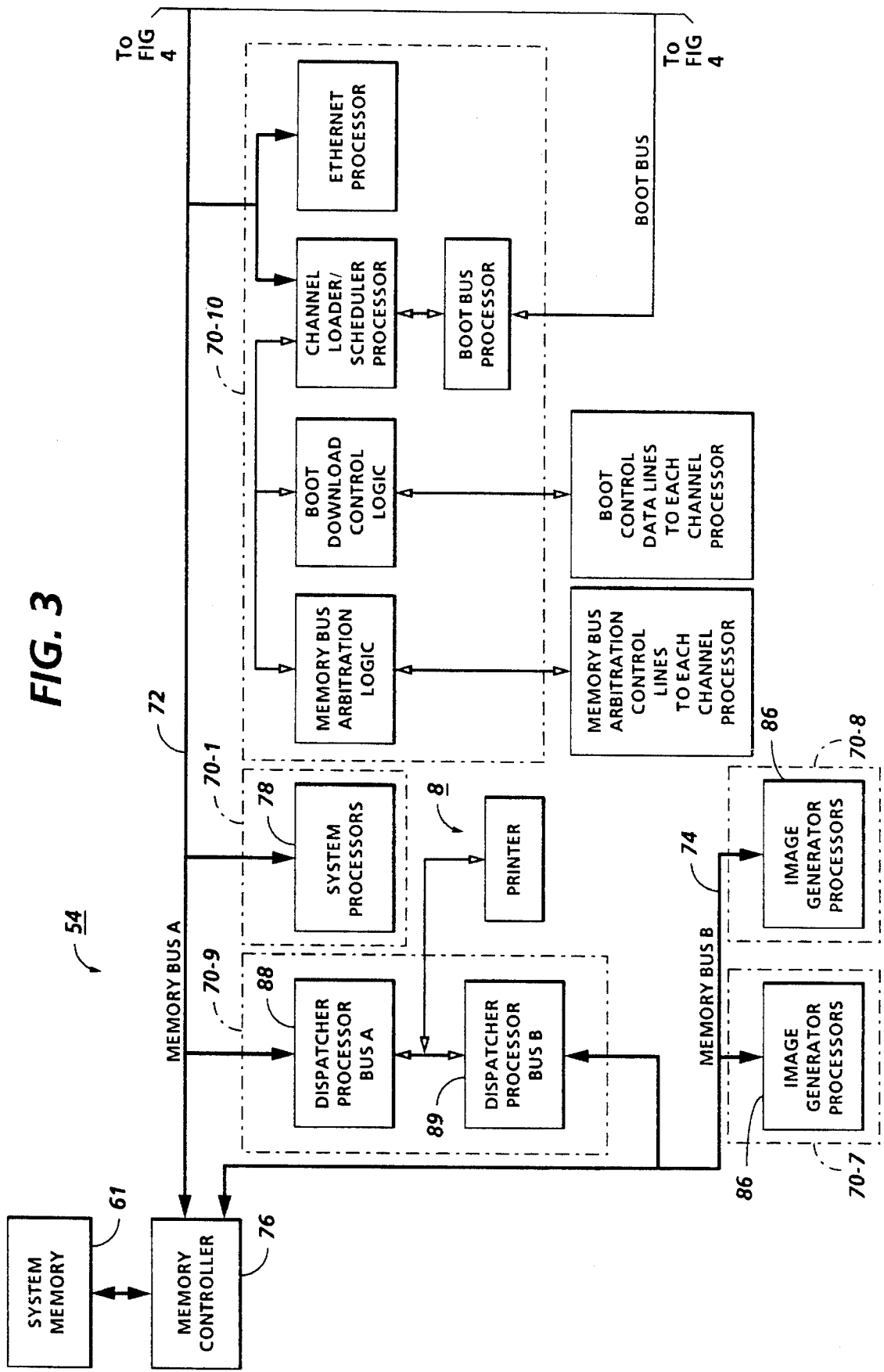
Figure 4:
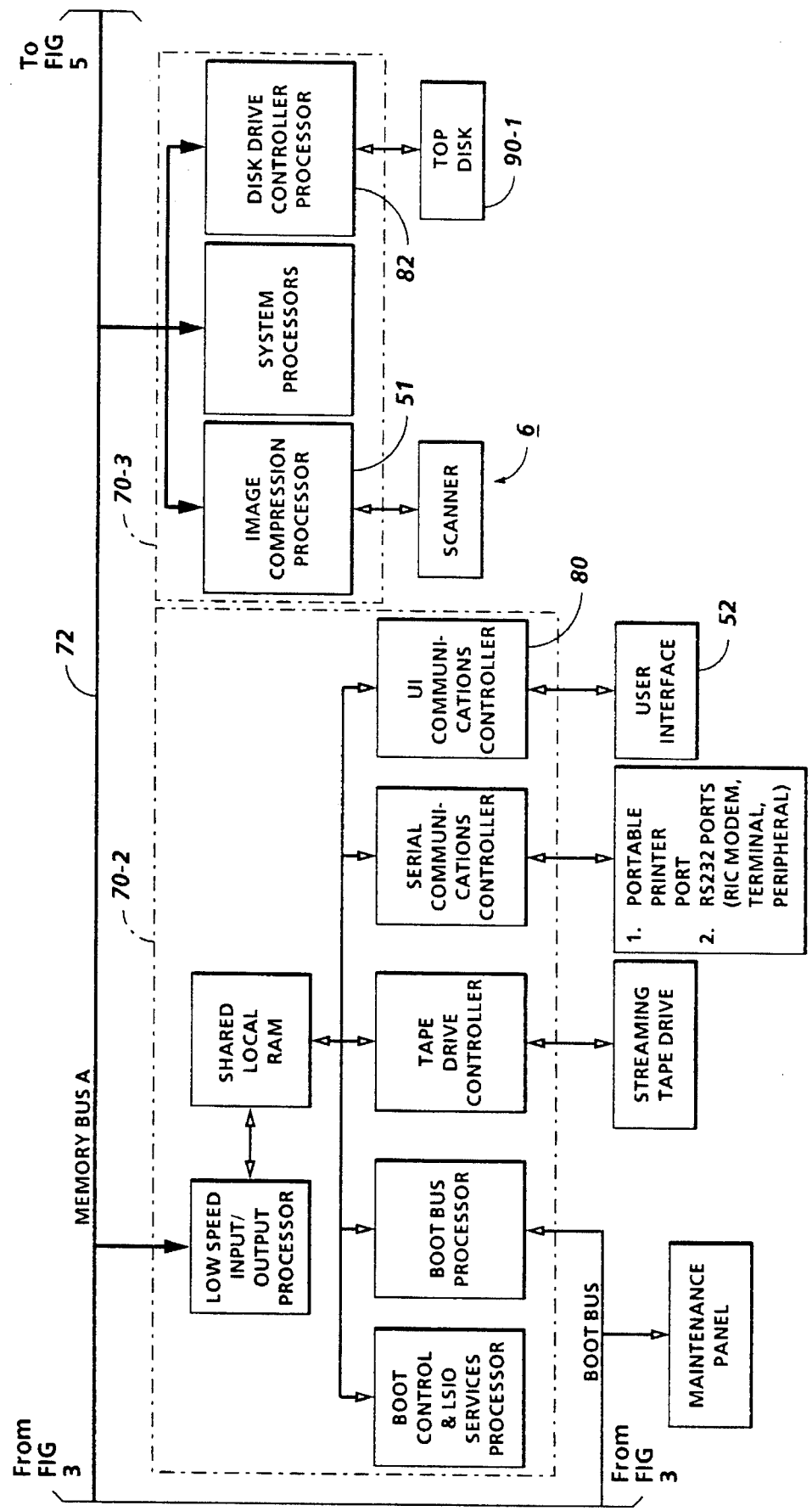
Figure 5:
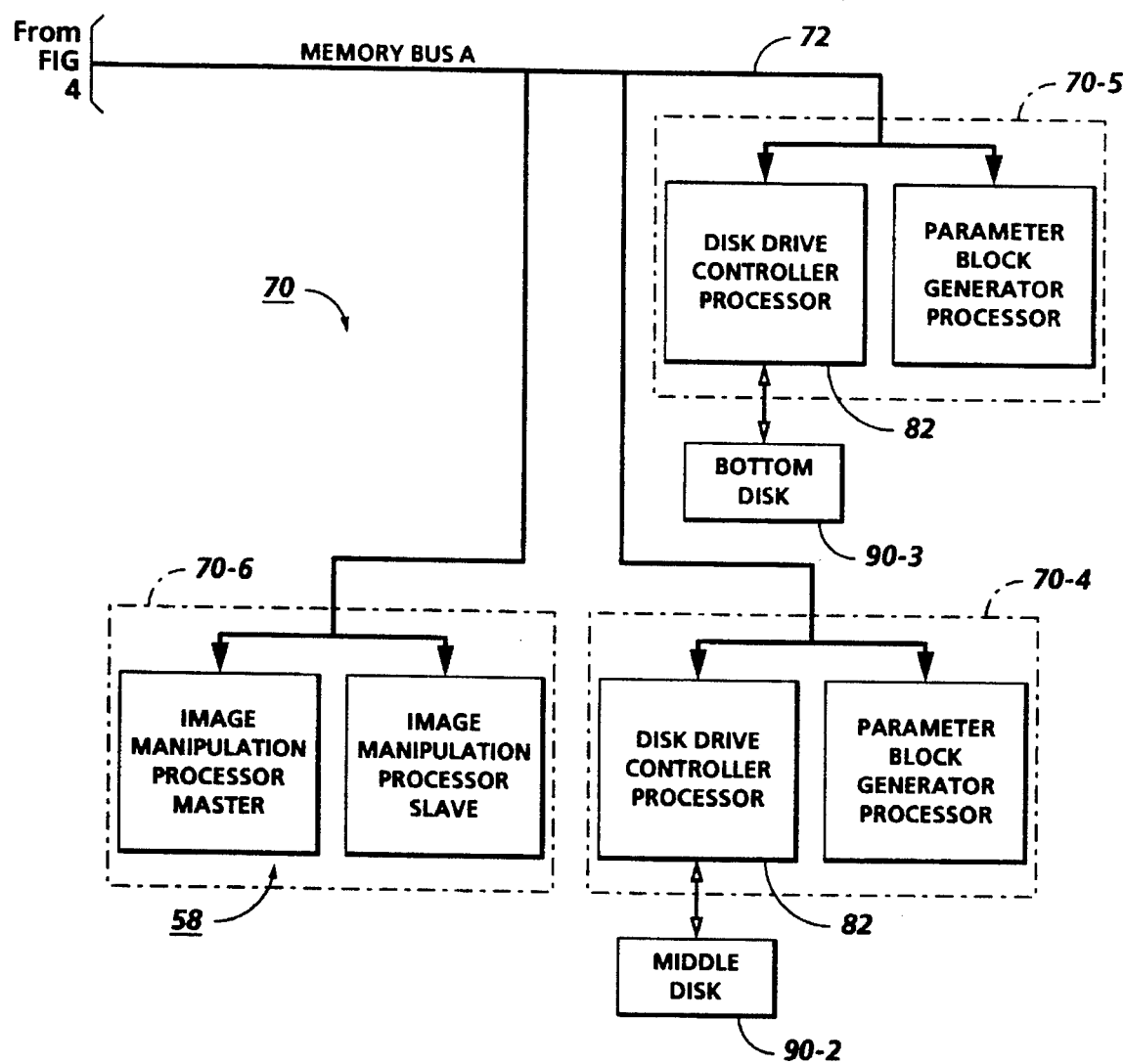
Figure 6:
Figure 7:
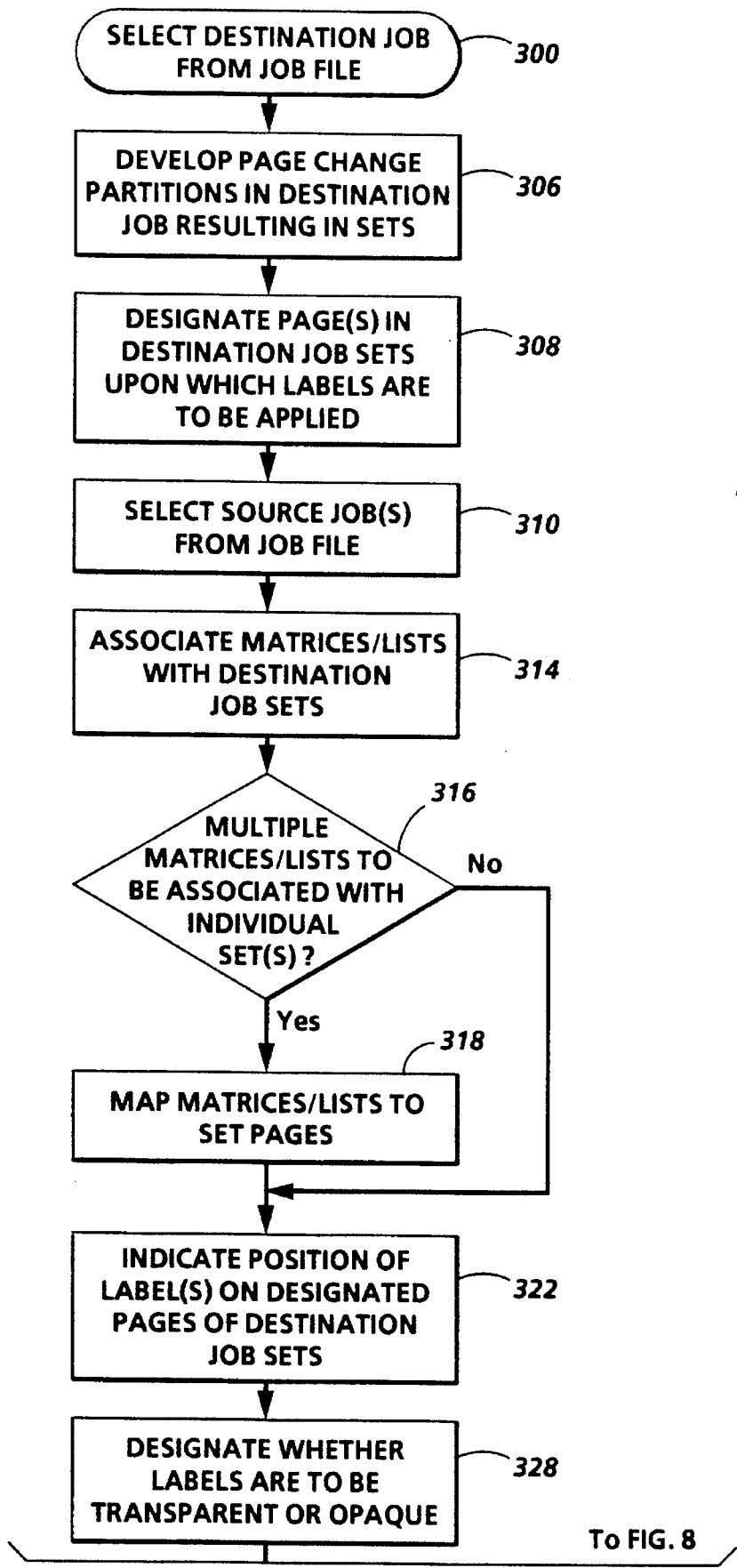
Figure 8:
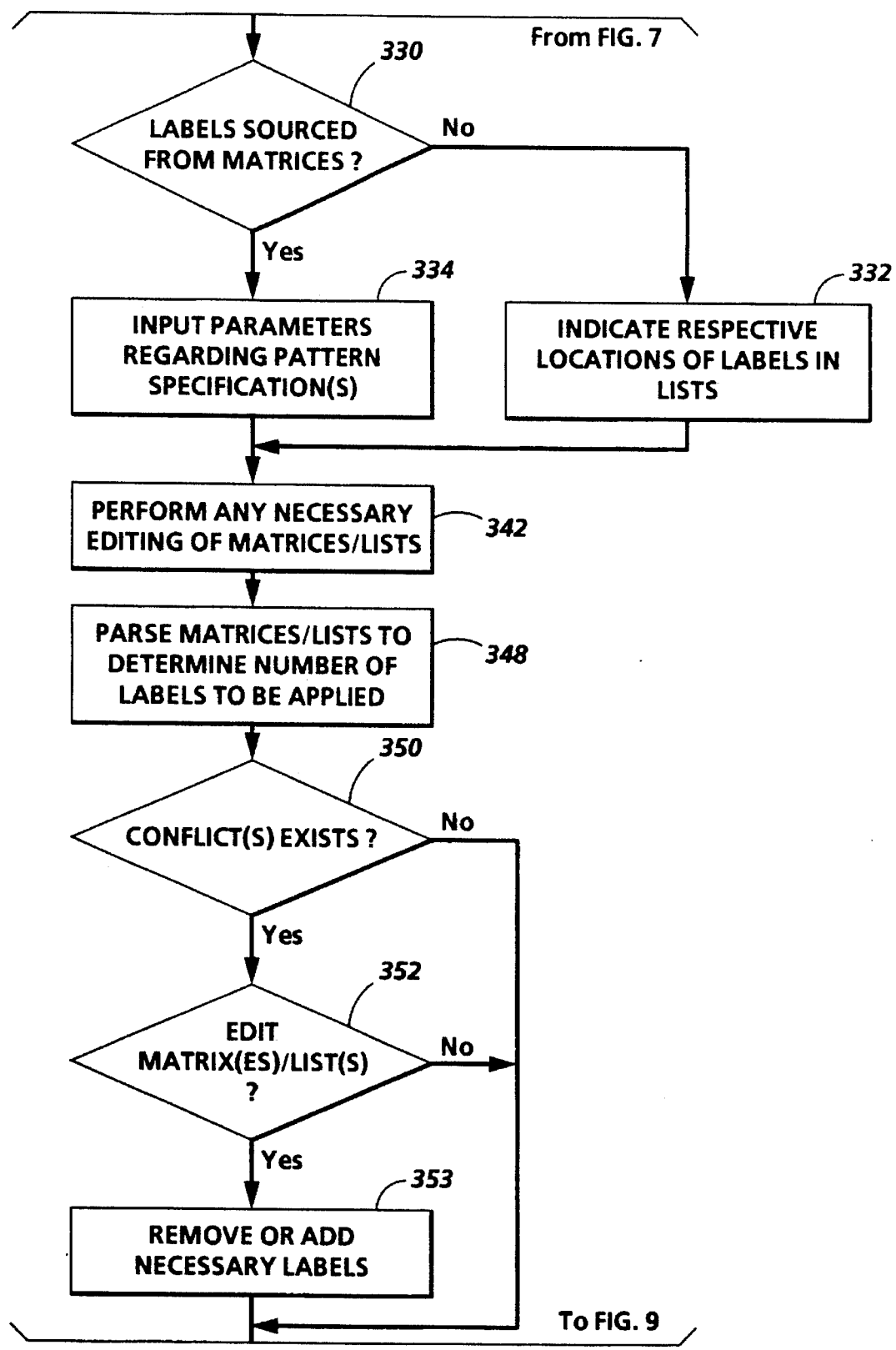
Figure 9:
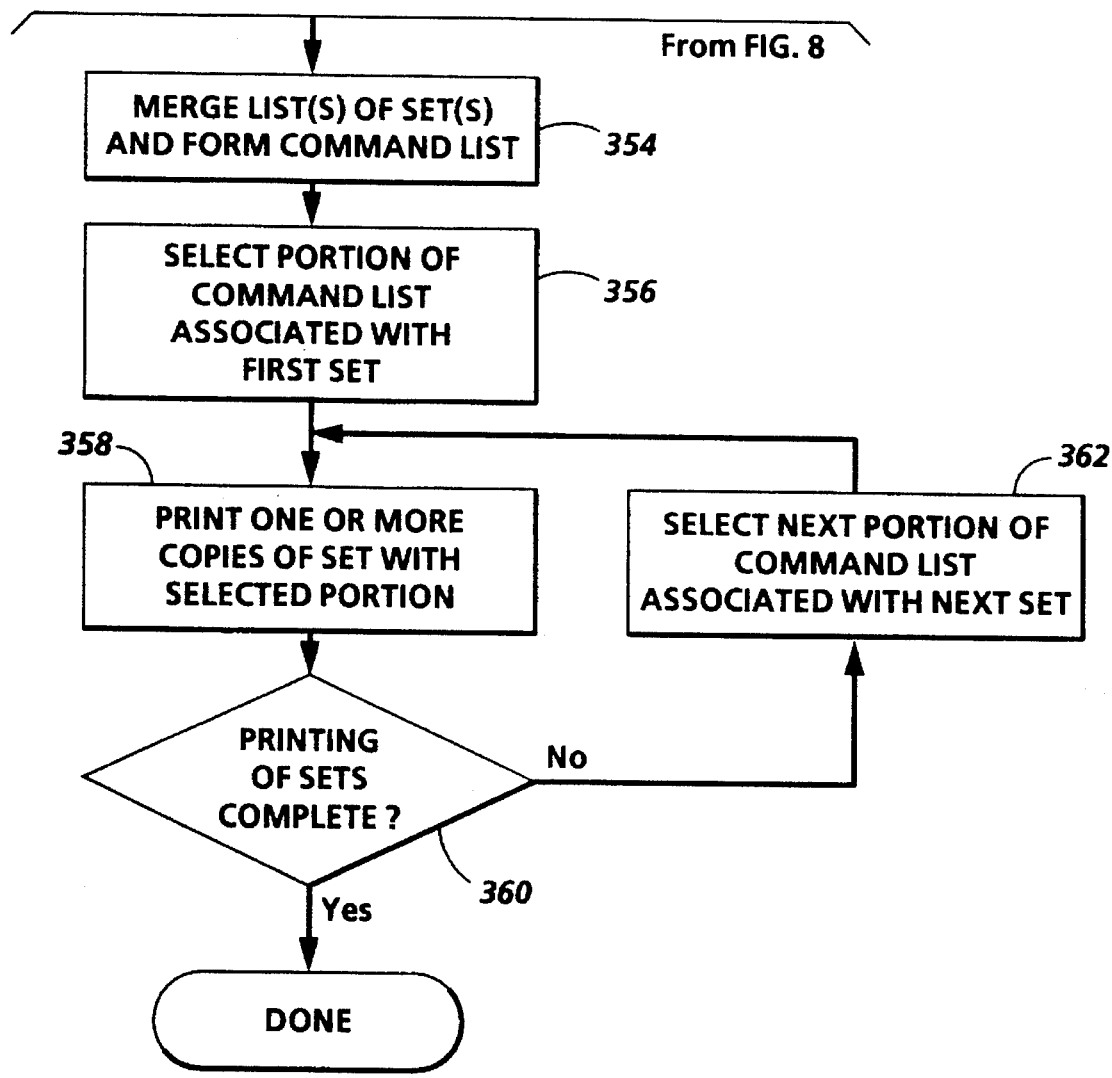
Figure 10:
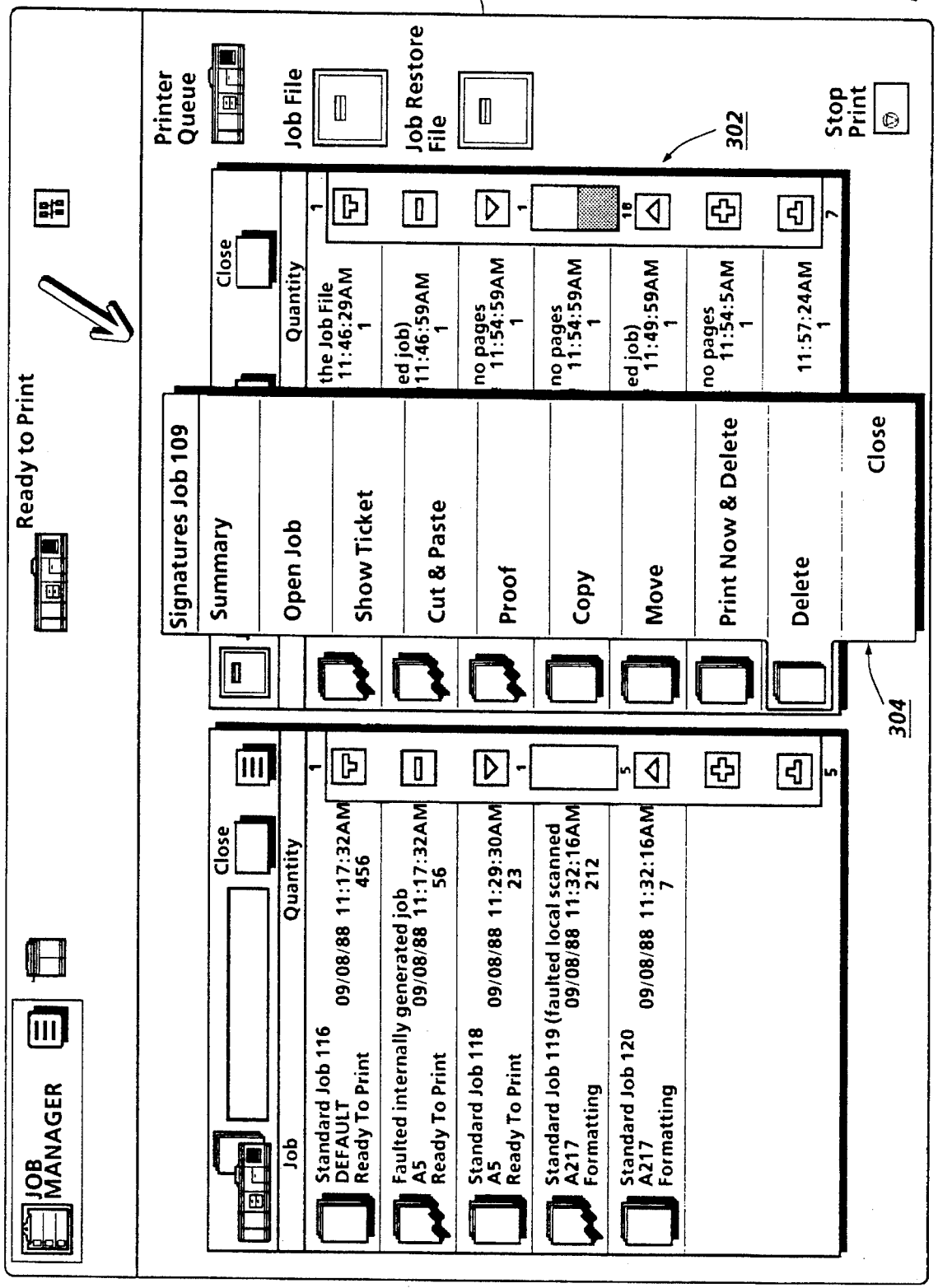
Figure 11:
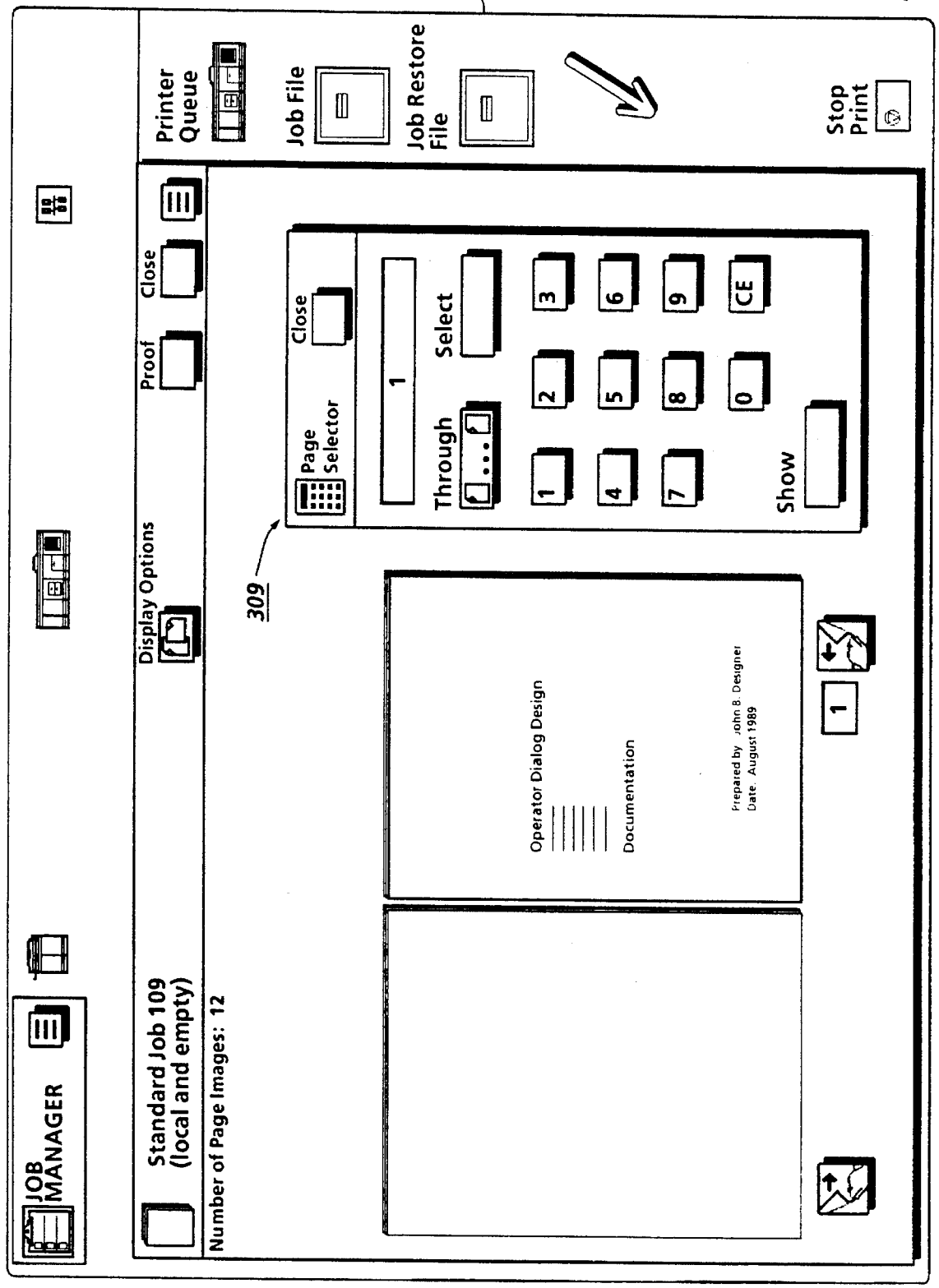
Figure 12:
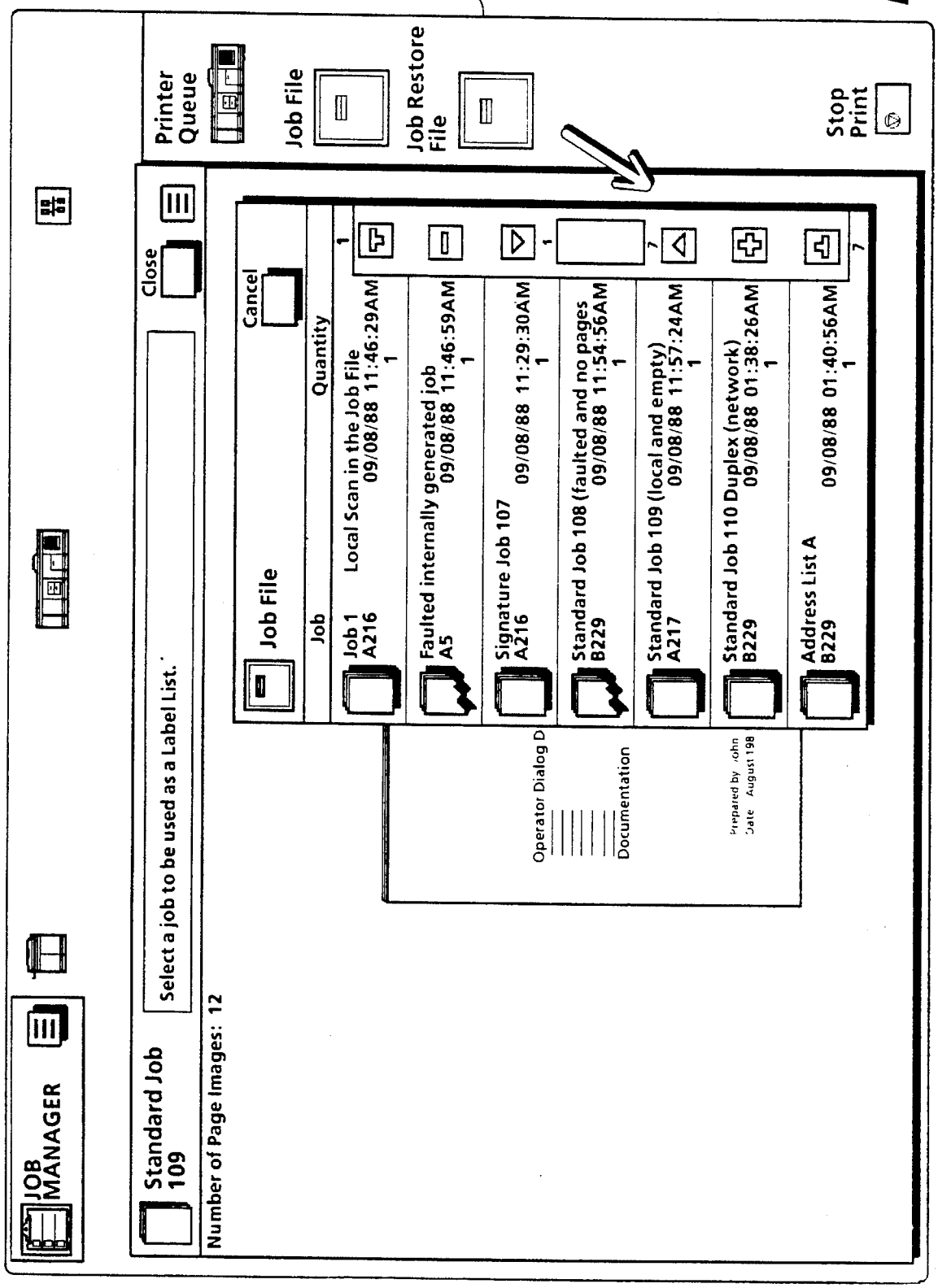
Figure 13:
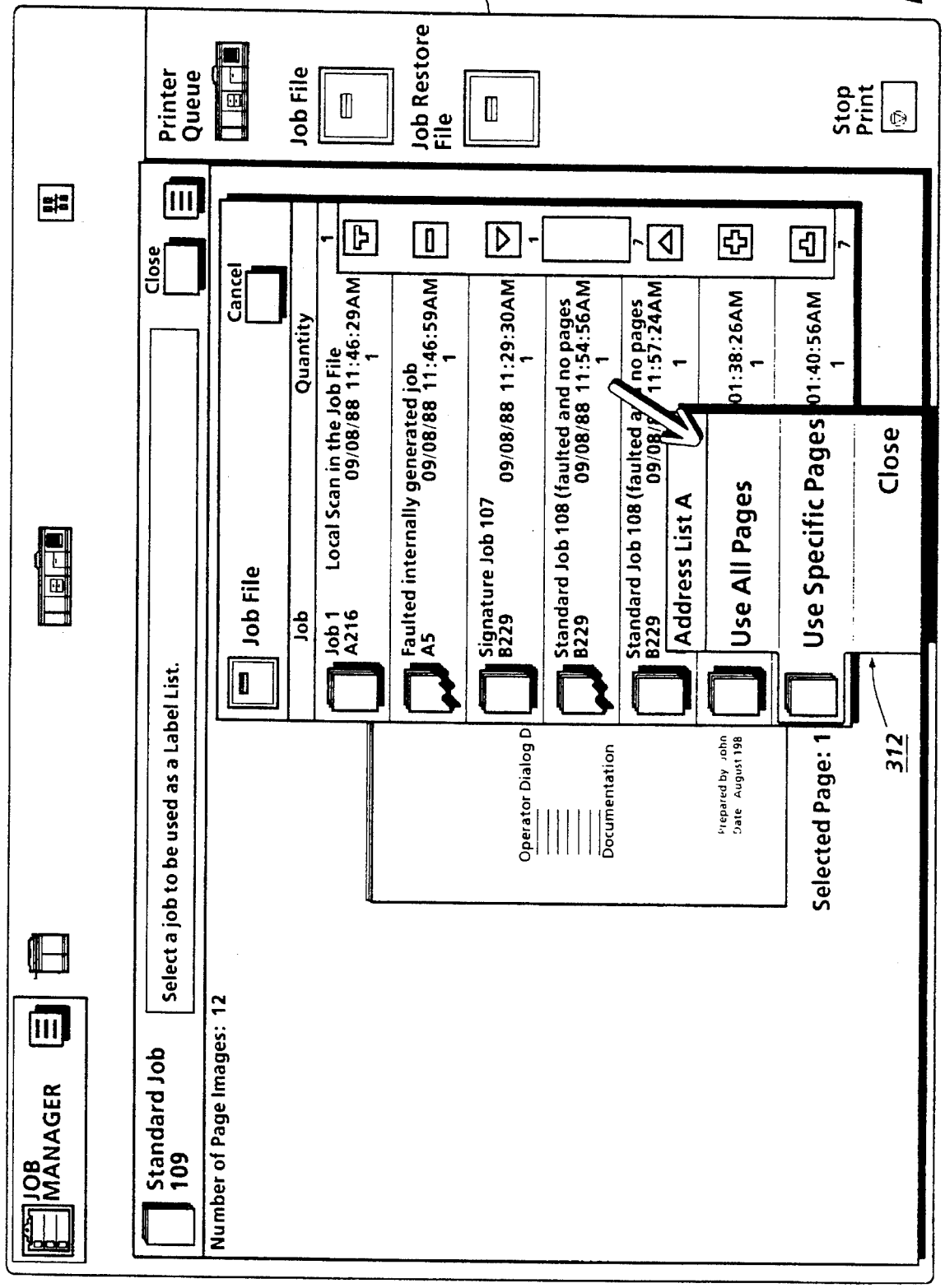
Figure 14:
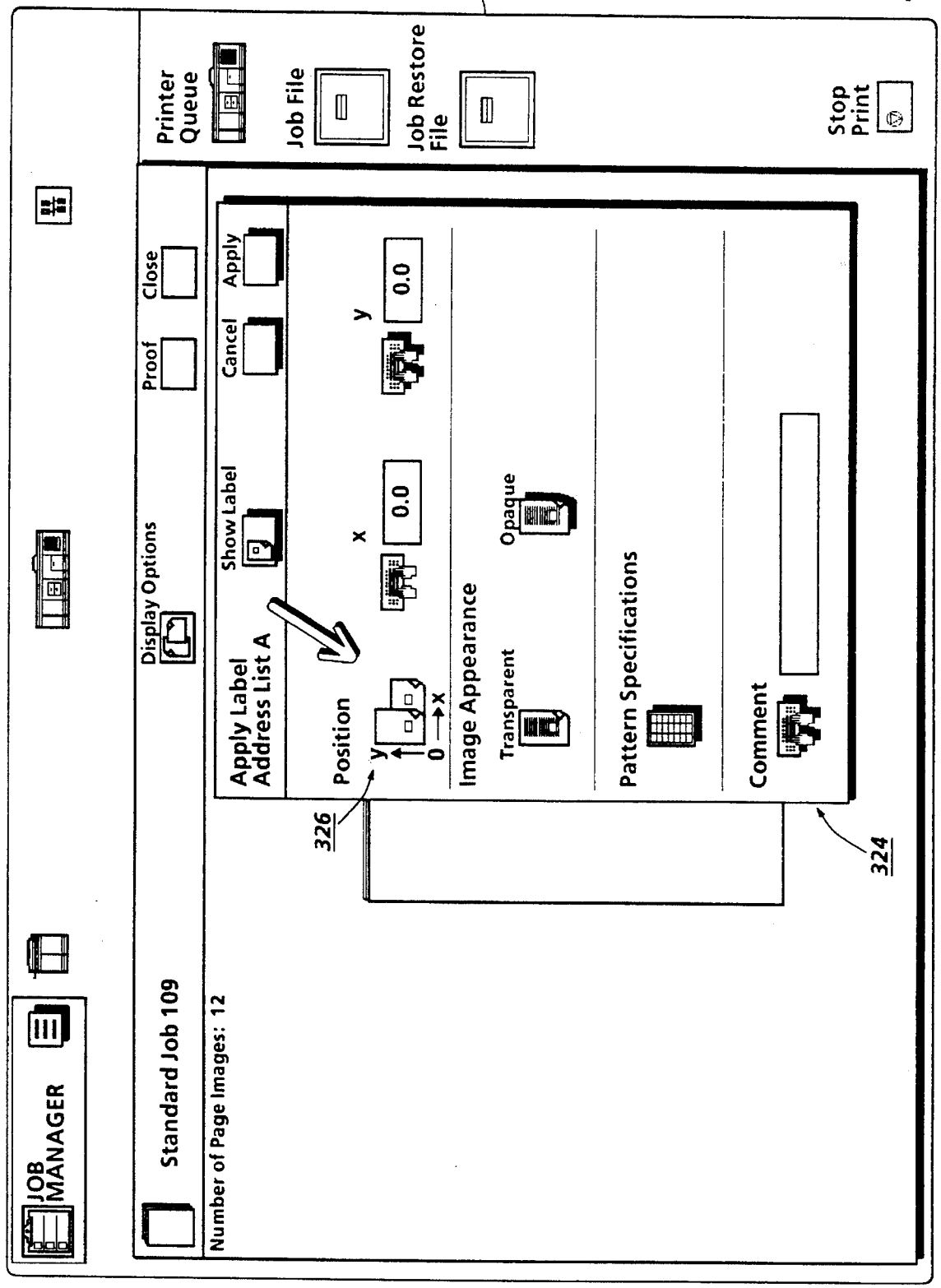
Figure 15:
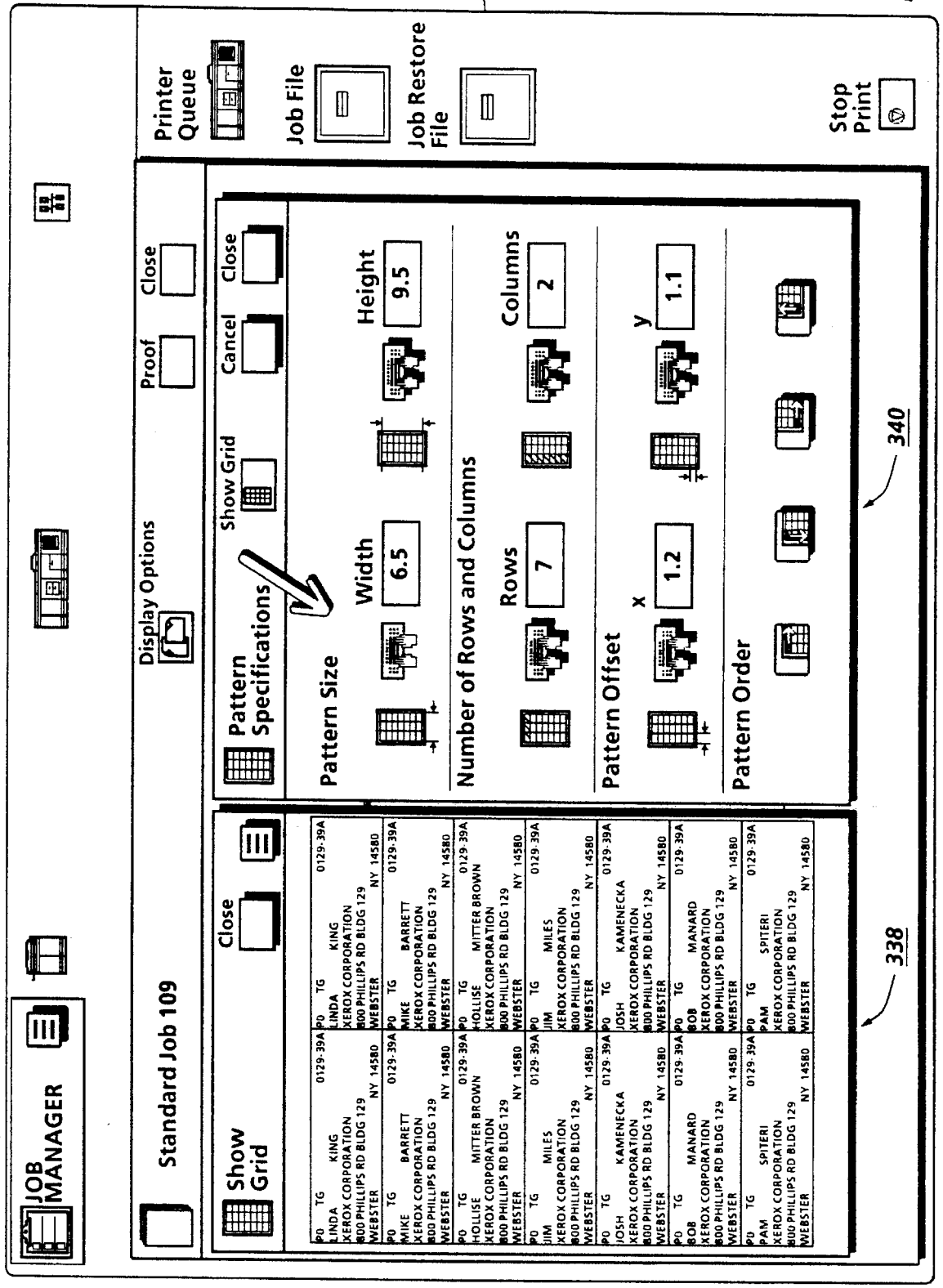
Figure 17:
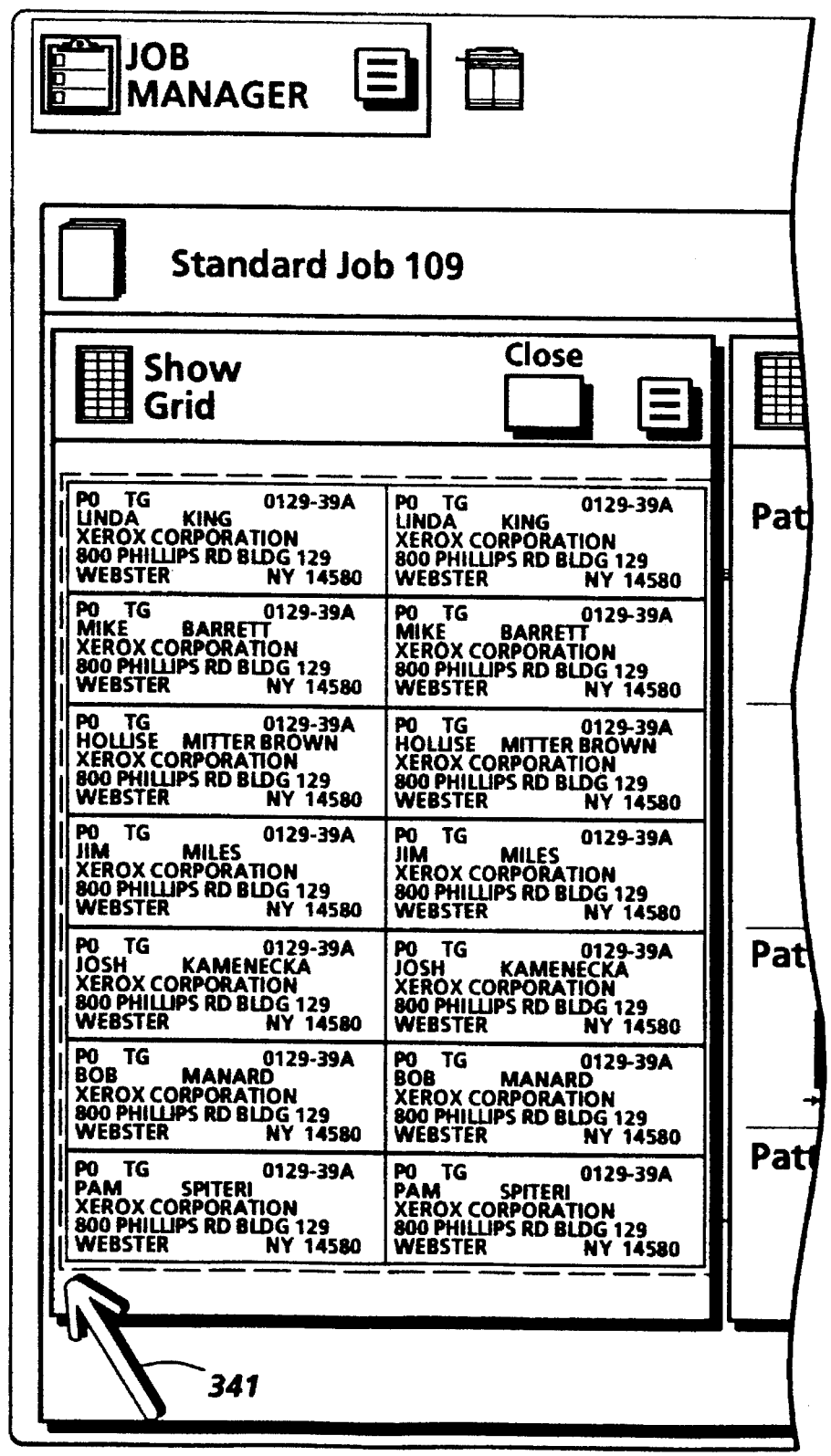
Figure 18:
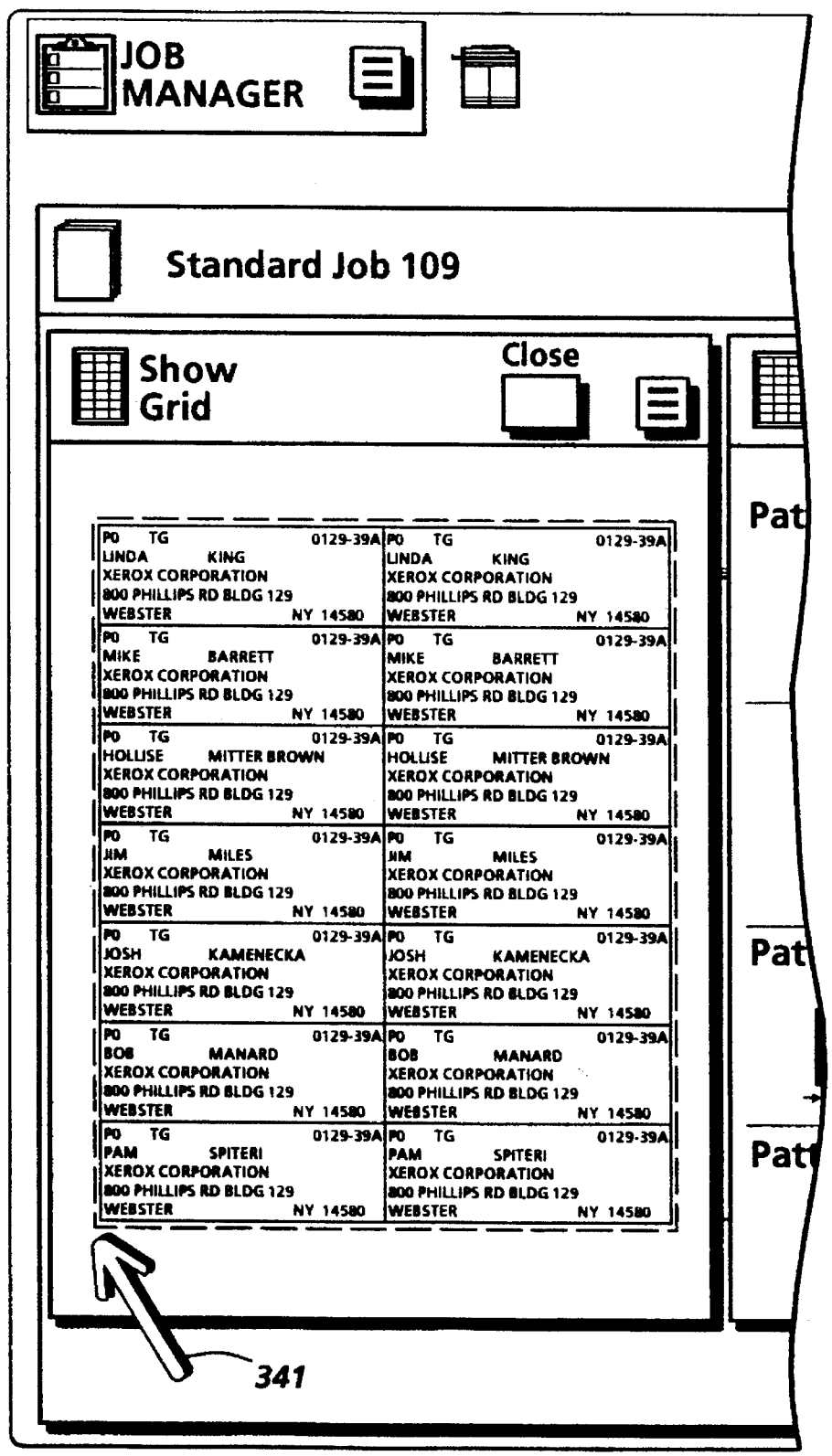

FIGS. 3–5 comprise a schematic block diagram showing the major parts of the control section for the printing system shown in FIG. 1;

FIG. 6 is an elevational view depicting a Job Ticket with Job Scorecard for programming set addressing jobs as displayed on the User Interface (UI) screen of the printing system shown in FIG. 1;

FIGS. 7–9 comprise a flow chart depicting a methodology for labeling selected pages in a print job;

FIG. 10 is an elevational view of a screen display in which a destination job is being selected from a job file in a job manager mode;

FIG. 11 is an elevational view of a screen display including a selector for designating job subsets upon which labels are to be applied;

FIG. 12 is an elevational view of a screen display in which a source job is shown as residing in the job file;

FIG. 13 is an elevational view of a screen display in which pages of a source job are shown as being specified;

FIG. 14 is an elevational view of a screen display including a window for adjusting the location of an electronic label on a print outline and for selecting pattern specifications;

FIG. 15 is an elevational view of a screen display including an electronic label list with a grid superposed thereon and a window for adjusting various parameters associated with the grid;

Figure 16:
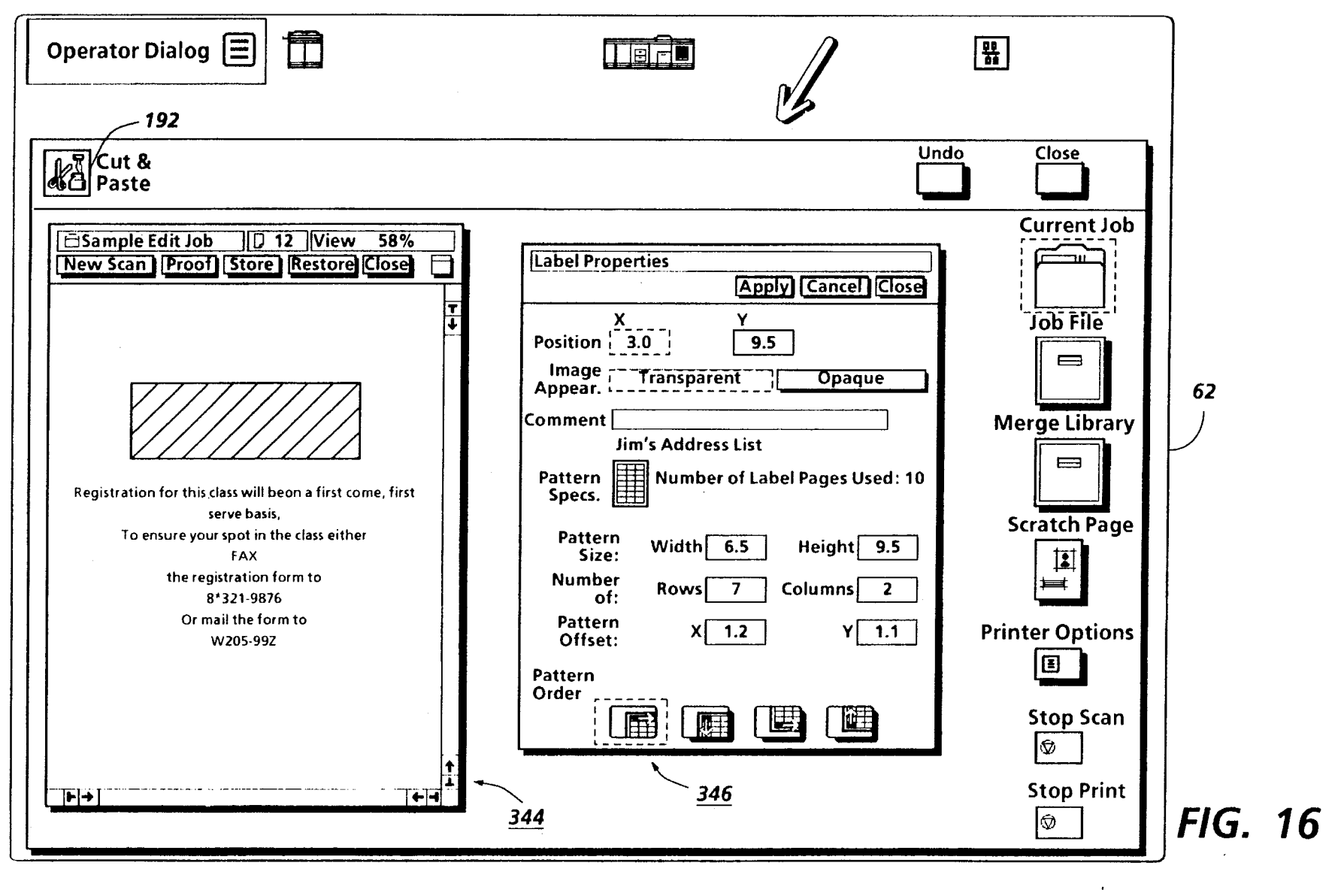

FIG. 16 is an elevational view of a screen display including a first window for displaying an electronic label on an electronic representation of a print outline and a second window for adjusting various properties associated with a destination job and a source job; and FIGS. 17A and 17B are partial, elevational views of respective screen displays illustrating, conjunctively, a technique for adjusting the dimensions of the electronic label list of FIG. 15.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 2:
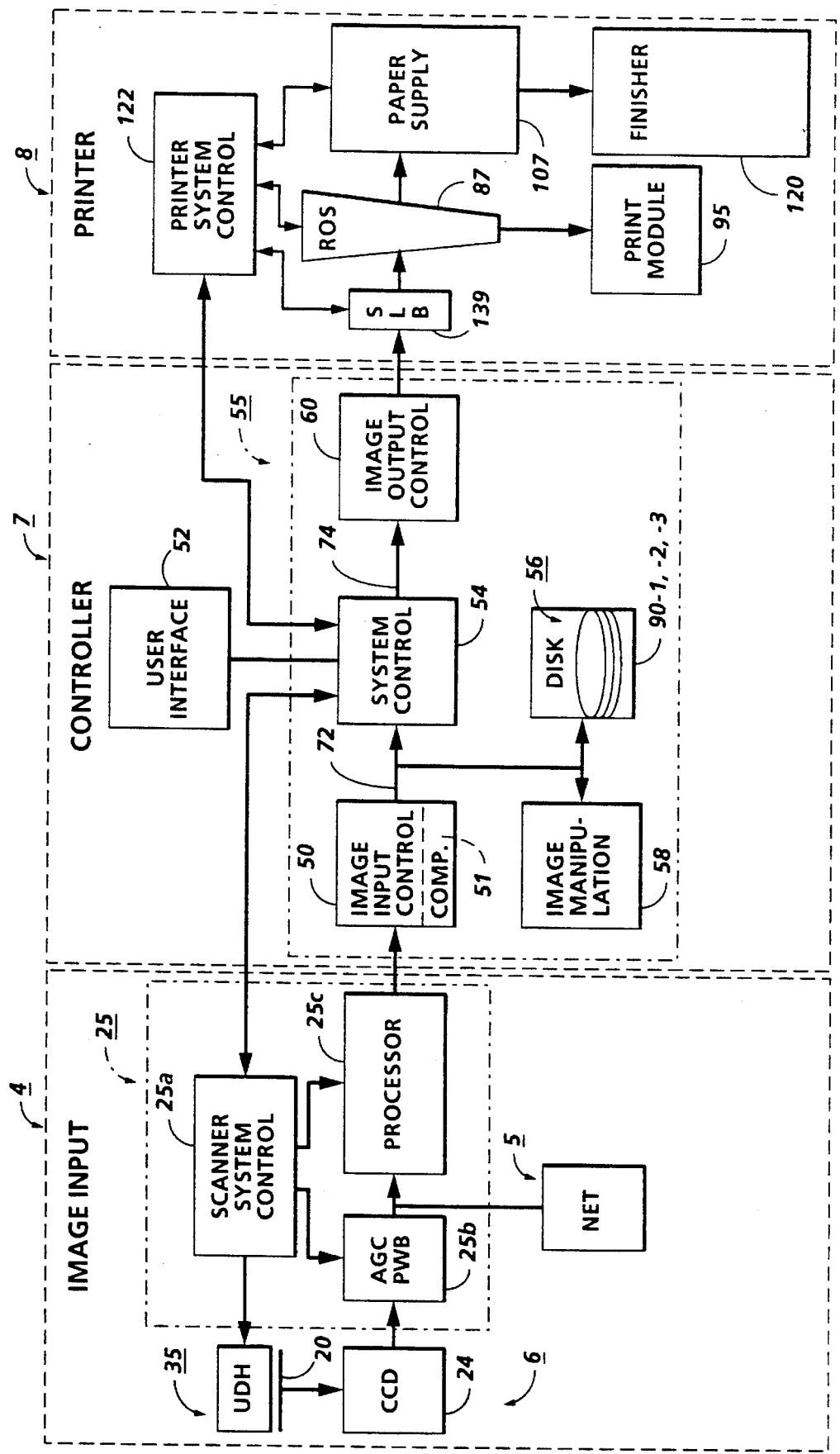
FIG. 2 is a block diagram depicting the major elements of the printing system shown in FIG. 1.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has a network 5 with a suitable communication channel such as an EtherNet® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 (FIG. 2) has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 122. ROS 87 has a two beam laser with the beams modulated in accordance with the content of an image signal input by acousto-optic modulator to provide dual imaging beams which are scanned across a moving photoreceptor of Print Module 95 by means of a rotating polygon. A detailed description of a print engine suitable for use with the present disclosed preferred embodiment is discussed in U.S. Pat. No. 5,170,340. It will be appreciated by those skilled in the art that other print engines, besides a laser-based print engine, could be used to implement the preferred embodiment of the present disclosure without affecting the concept upon which such disclosure is based. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 122 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multi-processor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point a cursor (not shown) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Referring particularly to FIGS. 3–5, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3–5), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3, respectively, of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring to FIG. 6, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job. Various Job Ticket types are provided, with access by means of Job Types and Tickets icon 157. In the example shown in FIG. 7, the Job Ticket for programming set addressing jobs is displayed.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

In a preferred embodiment, labels (e.g. addresses) are printed on selected pages of a print job, rather than on every page of the print job. Referring to FIGS. 7–17B, a technique, corresponding to the preferred embodiment, in which labels are printed on selected pages of a print job is discussed in detail. In the following explanation, it should be recognized that labels are part of a source job and the labels of the source job are printed on the pages of a destination job. Initially, at step 300 (FIGS. 7 and 10) a destination job is selected from a job file 302 while a job manager is in an Open Job submode. More specifically, as shown in FIG. 10, a selector 304 is positioned over a prospective destination job and the Open Job submode is activated with a fingertop or cursor. Operation of the job manager is discussed in U.S. Pat. No. 5,206,735 to Gauronski et al. ("'735 Patent"), the pertinent portions of which are incorporated herein. At step 306, the selected destination job, which preferably requires the printing of labels on a plurality of sets, is partitioned into one or more destination job sets. As will appear, the illustrated technique relates to a list driven approach in which the programmer need not indicate the number of sets to be printed. It will be appreciated by those skilled in the art, however, that the principles underlying the disclosed list-driven approach are equally applicable to a manual approach in which the programmer designates the number of sets to be printed.

The present explanation is accompanied throughout with an example (referred to as "current example") which serves to demonstrate some of the various features of the preferred embodiment. In the current example, the destination job is partitioned into a first set including pages 1–10 10 and a second set including pages 11–30. As explained in further detail below, due to the number of labels in the source job, 50 copies of the first set are printed and 20 copies of the second set are printed. In the current example, the 50 copies are "executive summaries" and the 20 copies of the second set are complete reports, each of which relate to the executive summary. It should be appreciated that the current example contemplates a situation in which 30 recipients will receive the executive summary only and 20 recipients will receive the executive summary in addition to a complete report.

Referring to FIGS. 7 and 11, at step 308, the programmer designates page(s), in the destination job sets, upon which labels are to be applied. The designation process is facilitated by use of a page selector 309, as shown in FIG. 23. The page selector is currently employed in the DocuTech® printing system and disclosed by the '735 Patent. In the current example, the page selector is used to designate that labels will be applied to pages 1, 12, 13, 18 and 25 of each printed set. Subsequent to designating pages in the destination job, one or more source jobs are selected (FIG. 12), per step 310, from the job file 302. In the illustrated embodiment of FIG. 13, a selector 312 of the type employed in the DocuTech® printing system, can be employed to select specific pages for application of labels to the destination job. It should be understood that the source job preferably includes one or more lists of labels, the labels, in one example, including a plurality of ordered addresses. As mentioned, in now allowed U.S. Pat. No. 5,309,558, the labels may originate from, among other sources, a scan job or a network job, and be ordered in a list or a matrix, the matrix, in one example, assuming the form of a 33—up mailer sheet.

At step 314, the matrices/lists of the source job are preferably associated with respective sets of the selected destination job. In one example of the preferred technique the matrices and/or lists of various jobs are used in the application of labels to the destination job sets developed in step 306. As indicated by steps 316, 318, each matrix or list can be, per step 318, mapped to one or more of these developed sets.

Referring to FIGS. 7 and 14, the position of each label as it is to be applied to a respective, selected destination job set page, is indicated in step 322. In the illustrated embodiment of FIG. 14, a template 324 is used to implement step 322 for a selected source job. For the contemplated embodiment, the template 324 can be used to assign label position on a page-by-page basis or on a job-wide basis. Accordingly, in the current example, label position can be adjusted for each of pages 1, 12, 13, 18 and 25 or any combination thereof. As shown in FIG. 14, the label to be applied is assigned a default position in a print outline 326, the default position being designated by the respective x, y coordinates 0.0 and 0.0. Through use of a fingertip or curser, the coordinates, and hence the position of the label, relative to the print outline 326, can be adjusted. It should be recognized that, in the current example, once the position of the labels are indicated for pages 1, 12, 13, 18 and 25, the labels will be printed at corresponding positions on the resulting copies of the sets. Furthermore, it should be recognized that the present technique contemplates a situation where it is desired to indicate multiple label positions on the same page so that multiple labels can be printed on the same set page. In the current example, two labels are to be printed on page 12. Finally, it should be recognized that a single label can be assigned to two different pages within the destination job, i.e. the same label, of a given matrix/list can be applied repeatedly. In the current example, the same label is applied to page 13 and 18. This sort of application is particularly appropriate for documents in which a particular reference, such as the name of a contest winner, is to be repeated throughout each destination job set. Additional information regarding the application of a label to a selected portion of a displayed, electronic representation of a print may be obtained by reference to now allowed U.S. Pat. No. 5,309,558.

Referring still to FIGS. 7 and 14, after indicating the position of the labels in the developed sets, label image appearance is set, via step 328, to designate whether a given label is to be opaque or transparent. This designation can be made on a label-by-label basis or on a job-wide basis. To understand why this step is useful, reference is made to copending FWC U.S. patent application Ser. No. 08/010,523 entitled "Process for Merging Merge Items with Prints Produced by Electronic Printing", filed by Hengst et al. on Jan. 27, 1993, the pertinent portions of which are incorporated herein. In particular, each label preferably comprises a bitmap or raster which merged onto an electronic page by superposing the bitmap, at a predesignated location, relative to the image information already on the electronic page. As will be appreciated by those skilled in the art, the background of the bitmap can be adjusted, in accordance with the opacity/transparency programming, to make the bitmap appear opaque or transparent relative to the image information on the electronic page.

As indicated above, the source job preferably comprises one or more matrices and/or one or more lists. As will be explained in further detail below, in printing the labels to the destination job, the labels are successively "picked off" a selected matrix (step 330) or list in a predetermined order. In order to pick off the label, the printing software needs to have a way of knowing the location of each label in memory. More particularly, each label occupies a certain amount of space and in order to read the label the printing software preferably scans the space for each label successively. As should be clear to those skilled in the art, there are many ways for defining the space occupied by each label. In one example, each label could be assigned to predefined locations (step 332) (FIG. 20) so that the printing software knows specifically where to go for finding each label. In another example, a list, assuming the form of a matrix (step 334), is used to define label location.

Referring to FIGS. 14 and 15 a preferred approach for using an electronic list, in the form of a matrix with a series of cells, is discussed in further detail. In particular, an electronic label list (FIG. 15), in the form of a 14-up mailer sheet, is generated, by one of the various techniques mentioned immediately above, and displayed on the UI screen 62. To insure that the electronic label list is in order for printing, a grid 338 is superposed, relative to the label list. Generation of the label list can be achieved through the use of a known graphics package, such as the graphics package disclosed in one of the following references, the pertinent portions of which are incorporated herein:

"Xerox Pro Illustrator Reference"

Version 2.0

Publisher: Xerox Corporation

Publication No. 610E 12400

Apr., 1988

"Xerox Global View"

VP Series Application

VP Series Reference Library

Version 3.0

Publisher: Xerox Corporation

In the preferred embodiment, a pattern specification window 340 (FIG. 15), which is opened by selecting a pattern specification icon (FIG. 14) is provided. The label grid window allows for adjustment of four grid parameters. With a first parameter, namely "pattern size" the overall width and length of the grid is specified for the actual space on an electronic page occupied by the labels. Static icons, displayed as if in the on, not selectable state, are disposed next to width and length type-in fields for facilitating the adjustment of pattern size. With a second parameter, namely "Number of Rows and Columns", the number of cells in the matrix is defined. As with the setting of the pattern size, static icons are employed to set the second parameter, i.e. the number of rows and columns in the grid. It will be appreciated that the setting of the first and second parameters impacts cell size. This is significant in that the size of the label applied to a print will vary directly as a result of the cell size set by adjusting the first and second parameters. It should also be appreciated that, with the cell size set, the suitability of the label for printing can be determined readily. That is, in one example, one of the cells can be applied to a displayed print outline for determining if the cell is suitable for application to a print. Indeed, referring to FIG. 16, an example of a cell, and thus a corresponding label, applied to an electronic page is shown.

Referring to FIGS. 17A and 17B, an alternative method of adjusting cell size is discussed in further detail. In FIG. 17A, the pattern of FIG. 15 is shown as being a first size with a corresponding first cell size. In the alternative method, a mouse curser 341 is disposed adjacent the pattern and moved in an outward or inward direction. In the example of FIG. 17B, the cursor is moved inward, which causes the pattern, and hence cell size, to decrease. It will be recognized by those skilled in the art that this sort of approach, which is similar to a scaling operation performed with Xerox software referred to as "Viewpoint" can be implemented with one of the references designated immediately above. A primary feature of this alternative approach is that it permits a user to alter cell size, and hence label size, dynamically. In this manner, the user can see readily what she or he will "get" in terms of cell size.

Depending on how a label list is generated, there may be a margin around the edge of the paper. The labels may actually be one inch from the edge of the page. To insure that the labels get sectioned properly, a third parameter, namely "offset" is adjusted. Preferably, the origin of a page is in the lower left corner so that x and y offset is measured from that point. That is, the offset is measured from the lower left corner of the page to the lower left corner of the label located in the lower left corner of the grid or pattern.

With a fourth parameter, namely "pattern order", the direction in which the labels are to be read from the matrix, in applying each label to a selected print in the destination job, is set in other words, the information provided by the fourth parameter provides the system with information regarding how to traverse the list. As illustrated in FIG. 15, there are four options, namely:

1) Start in the upper left corner of the page and traverse from left to right across the matrix list;
2) Start in the upper left corner of the page and traverse from top to bottom down the matrix list;
3) Start in the lower left corner and traverse from left to right across the matrix list; or
4) Start in the lower left corner and traverse from bottom to top across the matrix list.

This traversing feature provided by the fourth parameter provides flexibility to the label applying methodology in that it permits the user to read labels from one row before reading labels from another row or to read labels from one column before reading labels from another column. This feature can be particularly useful when used in conjunction with cut and paste capability. In one instance, it may be desirable to read labels from just the bottom row of a matrix list so that time is saved by starting in the lower left corner and only traversing from left to right across the bottom row of the matrix list. It should be appreciated that the pattern order parameter can be extended to starting anywhere in the grid so that certain labels can be effectively masked out. For example, in the illustrated embodiment of FIG. 15, a pattern order icon could be provided which allows the user to start at an arbitrary cell in the pattern and traverse in any direction within the pattern.

It should be appreciated that the pattern or matrix list can serve as a tool for insuring the integrity of the set labeling process. In particular, when a list is inputted to memory, each of the label representations therein may not be positioned suitably on the electronic page. By applying the grid to a source matrix list, a user of the printing system can determine readily that a remedy is required. Among other things, if the list has its origin in a scan job, the user can edit the corresponding hardcopy to form a replacement list, scan the replacement list and substitute it in memory for a corresponding defective list. Alternatively, the dimensions of the matrix can be altered so that all of the labels fit within respective cells. It should be further appreciated that use of the grid lends flexibility to the set labeling process. That is, by permitting the user to set direction of matrix traversal, the labels can be printed in more than one order.

The order of printing the labels from the matrix(es) and/or list(s) can be altered further through cut and paste operations. In one example, it may be desirable to print the labels of an originally provided list out of order so that the resulting printed items can be outputted in a selected order, such as alphabetical order. The process of positioning the labels in the source job can be facilitated by way of an editing step 342. An implementation of the editing step is discussed in further detail in now allowed U.S. patent application Ser. No. 07/628,130. Referring again to FIG. 16, a dialog, intended to facilitate the editing each label, is shown. As illustrated, the dialog includes a display 344, for depicting the label, and a property adjuster 346 for, among other things, altering the position of the label, relative to the display (and hence the resulting labeled print), and adjusting image appearance. While the label is shown as being an opaque box on the display 344, the label could be shown in terms of "What You See Is What You Get", i.e. as a WYSWYG item.

Changing the order of printing the labels is particularly easy when using the matrix list. As mentioned above it may be desired to print the labels in alphabetical order. In one example, this can be achieved by performing appropriate cut and paste operations with the labels, and then applying the pattern as described above.

Once the destination and source job are set up, the matrices/lists are parsed (step 348) to determine if any conflicts exist between multiple lists used to apply the labels. In other words the parsing is performed to determine if a correct number of labels has been supplied for purposes of labeling the destination job. As would be expected, one or more of the lists may include too few or too many labels. The types of conflicts that might arise can be best understood by the following variation of the current example: Assume that list 1, with 43 labels, is supplied for pages 12 and list 2, with 18 labels is supplied for page 25. Due to the specifications set for the print job, 40 labels are required to print two labels on 20 copies of page 12, while 20 labels are required to print a label on each copy of page 25. Accordingly, the technique would determine, at step 350, that a conflict exists and solicit any appropriate editing remedies at step 352.

In one form of conflict resolution, a conflict could be determined by taking the larger of the two list numbers (i.e. 43 in the variation of the current example) and dividing it by the smaller of the two list numbers (:i.e. 18) and determining if the dividend is an integer. If the number is an integer then, in most cases, no conflict exists. If, on the hand, the dividend is not an integer, then a conflict can be declared with certainty. This technique of conflict resolution is applicable whether the number of set copies to be printed is set by the number of labels in the matrices/lists or manually by an operator.

As indicated at step 353, an editing remedy for a conflict could include removing and/or adding labels from the lists. Two remedies to the above situation would assume the form of deleting three labels from list 1 and adding two labels to list 2. As will be understood, in various settings, such as at a remote printing facility of a third party vendor, it is not always possible to determine what labels should be either added or deleted. Consequently, when no editing remedy can be taken, a blank is preferably printed in place of the unavailable label, and an error message is preferably issued when there is a surplus of labels in any given matrix/list.

To print labels on selected pages of each set, various print commands are preferably employed to designate whether a print is to be labeled and, if so, from where a given label is to be sourced. Referring to the current example, the following lists are provided: list 1 of 50 labels, list 2 of 40 labels, list 3 of 1 label and list 4 of 20 labels. While the following discussion only refers to sourcing labels from one or more lists, it is understood that the lists would preferably assume the form of a matrix. Generally, the 50 labels of list 1 are applied successively to the first page of each of the 50 copies of the first set (namely pages 1–10), the 40 labels are applied successively, two at a time, to the twelfth page of each of the 20 copies of the second set (namely pages 11–30), the label of list 3 is applied to the thirteenth and eighteenth pages of each of the 20 copies of the second set, and the 20 labels of list 4 are applied successively, to the twenty-fifth page of each of the 20 copies of the second set.

More particularly, in the preferred approach of printing pages 1–10, the first label of list 1 is printed, at a predesignated location, on page 1 of the first set copy while pages 2–10 are printed without labels. This process is repeated, successively accessing the next label on list 1, each time, until all 50 labels have been applied to the 50 copies of the first set. For pages 11–30, the first two labels in list 2 are sourced and printed, at predesignated locations, on page 12 while the same label is sourced from list 3 and printed on pages 13 and 18, at predesignated locations. Finally, the first label from list 4 is printed, at a predesignated location, on page 25, while pages 11, 14–17, 19–24 and 26–30 are printed without labels. This process is repeated, working successively through lists 2–4 until all of the labels are applied to the twenty copies of the second set, i.e. for each time a set copy is generated, the two next successive labels are applied from list 2, the same label is applied from list 3, the next successive label is applied from list 4 and pages 11, 14–17, 19–24 and 26–30 are printed without labels.

It will be recognized by those skilled in the art that the above procedure can be implemented quite readily with suitable code including a list of appropriate commands for fetching image data, relating to both the destination job and the source job (i.e. the lists), from memory, in a preselected order. Referring to FIG. 21, a flow chart, corresponding with an example of such suitable code, is discussed. The example of FIG. 21 assumes that the print job includes multiple sets and multiple lists; however, the concept underlying the exemplary approach of FIG. 21 applies with equal force to a print job having just one set and being printed from a single list. At step 354, the lists of the source job are merged in accordance with the order in which each label is to be applied to the destination job. For each label, a command is formulated for merging the label at a designated location on a destination job set page. The formulated commands are then placed in the command list in an order which corresponds to their eventual order of application. Additionally, commands for printing image data on both labeled and unlabeled pages are formulated and inserted into the command list at appropriate locations.

It will be appreciated by those skilled in the art, that the following command list contains portions which correspond with the printing of one or copies of each set. In the current example, for instance, the first portion of the command list would include commands for merging the 50 labels of list 1 successively on the first page of 50 copies of the first set and for printing the image data associated with the first set on pages 1–10 of the 50 copies of the first set.

Upon forming the command list, the first portion of the command list is, per step 356, selected. Referring to step 358, the image data is printed on the pages of the first set, and the labels associated with the first set are applied at predesignated locations on one or more selected pages of each copy of the set, in accordance with commands of the selected portion. Once labeling has been performed for the first set, it is determined, via step 360, whether copies of other sets are to be made. Assuming that further printing of other sets is required, the next portion of the command list associated with the next set is, per step 362, selected. Upon selecting the next portion, the printing step 358 is repeated. Once all of the sets have been printed, the process is complete. Considering the current example, in view of the discussion of steps 358, 360 and 362, once 50 copies of the first set is completed, pages 11–30 are printed in such a manner that the labels of lists 2, 3 and 4 are applied to designated pages of the second set at preindicated positions. It will be recognized that the commands of the command list are arranged in a manner that causes the labels of the lists to be applied successively to designated pages of the set copies in the selected order discussed above.

What is claimed is:

1. A method of labeling a job in a printing system, the printing system including a user interface with a display screen, a print outline, defined by a visible boundary, being displayed on the display screen, comprising the steps of:

storing, in memory, a list of electronic labels, wherein each of the electronic labels comprises a set of pixels arranged to create an image;

selecting an identifiable area on the print outline;

displaying, on the display screen, the list of electronic labels and the print outline with the selected identifiable area, the selected identifiable area being positionable on the print outline for representing a relative size, location and orientation of an area on a print upon which one of the electronic labels is to be printed, said displaying step including applying a grid to the list of electronic labels so that a series of cells is superposed relative to the electronic labels;

indicating, with the print outline, a location at which a copy of the one electronic label is to be printed on a selected one of a plurality of prints;

determining whether a selected number of pixels in the set of pixels for the one electronic label are disposed within a corresponding one of the series of cells; and in response to determining, with said determining step, that the selected number of pixels for the one electronic label are disposed within the corresponding one of the cells, producing a print with a copy of the one electronic label, wherein the copy of the one electronic label is printed on the print at the location.

2. The method of claim 1, further comprising the step of substituting a replacement list of electronic labels, in place of the stored list of electronic labels, when it is determined, with said determining step that the selected number of pixels in the set of pixels for the one electronic label are not disposed within the corresponding one of the series of cells.

3. The method of claim 1, further comprising the step of configuring the series of cells as a matrix including a selected number of rows and a selected number of columns.

4. The method of claim 1, further comprising the step of inputting one or more parameters, to the printing system, for generating the grid.

5. The method of claim 4, wherein said inputting step includes designating a number of cells to be provided in the series of cells.

6. The method of claim 4, wherein said applying step includes manipulating the grid dynamically so that one of the parameters is varied.

7. The method of claim 6, in which each cell has an area including a cell size, wherein said manipulating step includes dynamically varying the cell size so that the area of each cell is scaled uniformly.

8. The method of claim 1, wherein said producing step includes printing selected ones of the electronic labels of the list of electronic labels at preselected identifiable areas on the plurality of prints.

9. The method of claim 8, further comprising the step of designating an order in which the labels are to be printed.

10. The method of claim 1, in which the series of cells is configured as a matrix including a selected number of rows and a selected number of columns, wherein said producing step includes designating one row of labels to be printed prior to the printing of another row of labels or designating one column of labels to be printed prior to the printing of another column of labels.

11. The method of claim 1, in which a plurality of electronic labels is disposed, respectively in the series of cells, in a first selected order, further comprising the step of editing selected ones of the plurality of electronic labels so that the plurality of electronic labels is disposed, respectively, in the series of cells, in a second selected order, the first selected order being different than the second selected order.

* * * * *